United States Patent [19]
Guillaume et al.

[11] Patent Number: 4,494,923
[45] Date of Patent: Jan. 22, 1985

[54] OXY-FUEL BURNERS

[75] Inventors: Paul Guillaume, Ivry-sur-Seine; Luc Vezin, Domont; Bernard Dubi, Velizy Villacoublay, all of France

[73] Assignee: L'Air Liquide, Societe Anonyme Pour L'Etude Et L'Exploitation Des Procedes Georges Claude, Paris, France

[21] Appl. No.: 523,621

[22] Filed: Aug. 15, 1983

[30] Foreign Application Priority Data

Aug. 25, 1982 [FR] France .................. 82 14566

[51] Int. Cl.³ .............................................. F23Q 3/00
[52] U.S. Cl. .................................. 431/9; 431/264; 431/266
[58] Field of Search ............. 431/266, 264, 353, 6, 431/9

[56] References Cited

U.S. PATENT DOCUMENTS

| | | | |
|---|---|---|---|
| 2,668,592 | 2/1954 | Piros et al. | 166/17 |
| 3,092,166 | 6/1963 | Shepherd | 431/353 |
| 3,285,319 | 11/1966 | Hartline | 158/115 |
| 3,302,685 | 2/1967 | Ono et al. | 431/25 |
| 3,361,185 | 1/1968 | Anderson et al. | 158/7.5 |
| 3,545,903 | 12/1970 | McCullough | 431/353 |
| 3,614,280 | 10/1971 | Tamio | 431/266 |
| 3,685,740 | 8/1972 | Shepherd | 431/353 |
| 3,729,285 | 4/1973 | Schwedersky | 431/284 |

FOREIGN PATENT DOCUMENTS

| | | |
|---|---|---|
| 2336693 | 7/1973 | Fed. Rep. of Germany . |
| 1416121 | 9/1965 | France . |
| 1482582 | 4/1967 | France . |
| 1046967 | 10/1966 | United Kingdom . |

*Primary Examiner*—Carroll B. Dority, Jr.
*Attorney, Agent, or Firm*—Lee C. Robinson, Jr.

[57] ABSTRACT

The invention relates to the electric ignition of oxy-fuel burners, as well as to the detection of the flame of these burners.

A spark is induced between an electrode and the body of the burner, the said electrode being situated in the area of the recirculation flows having a relative proportion of oxygen and fuel comprised between the lower and upper limits of flammability, close to the said upper limit.

The invention is applicable to burners supplied with a gaseous fuel.

6 Claims, 3 Drawing Figures

4,494,923

OXY-FUEL BURNERS

BACKGROUND OF THE INVENTION

The present invention relates in essence to a method for electric ignition of any oxy-fuel burner and to the burners themselves.

The electric ignition of air-fuel burners, consisting in using an H.T. discharge into the gaseous flow emerging from these burners, has not been applied to oxy-fuel burners until now. As a matter of fact, the temperature and oxidation level within an oxy-fuel flame are such that the electrodes utilised for this discharge are destroyed rapidly by melting and/or gas cutting. The ignition of oxy-fuel burners was consequently impossible without ancillary apparatus such as pilot burners or glow-type igniters, or else the application of the arc of an arc furnace for example, in some special cases.

It is known that oxy-fuel burners are supplied separately with oxygen and a gaseous fuel and that the jets issuing from the same are mixed at a particular distance from their front surface, in a proportion close to stoichiometric, these jets causing recirculation flows between them and in the space situated between the said area and the said front surface, which carry a fraction of the burnt gases towards the burner. A gaseous mixture denuded partially of oxygen and fuel, and the composition of which, being the relative proportion of oxygen and fuel, varies locally as a function of the geometry of the burner, that is to say of the position and distribution of the orifices from which the jets had emerged, is thus obtained between the two jets issuing from the burner.

SUMMARY OF THE INVENTION

The present invention has for an object to allow of electric ignition of oxy-fuel burners, that is to say to prevent the shortcomings encountered in this technique until now, and to this end it proposes a method according to which an electric ignition spark is caused within a volume of the aforesaid recirculation flows of which the relative proportions of oxygen and fuel lie between the lower and upper limits of inflammability, close to the said upper limit.

It is obvious that the fact of selecting a volume partially denuded of oxygen and fuel for induction of the spark, evidently whilst remaining within the inflammability limits, has the result that the thermal stresses and oxidation stresses to which the electrodes are exposed, are reduced.

The fact that a point close to the upper limit of inflammability is established, being that richer in fuel and thus more reducing, has the result of protecting the electrodes more satisfactorily against the oxidation actions.

According to another feature of the invention, a complementary jet of fuel is directed into the ignition space.

This additional fuel causes the composition of the recirculation flows to change towards fuel-rich proportions.

If the fuel is natural gas, the electric ignition spark is caused close to the upper limit, amounting to 60% of natural gas and 40% of oxygen.

For application of the aforesaid method, the invention also proposes an oxy-fuel burner of the kind comprising means of supplying oxygen and means of supplying fuel, and in which the jets of oxygen and fuel meet whilst giving rise to recirculation flows having a locally variable relative proportion of oxygen and fuel.

The burner in accordance with the invention comprises means for generating an electric potential difference, the said means being situated within a volume of the said recirculation flows at which the resulting mixture is between the lower and upper inflammability limits but close to the said upper limit.

Still according to the invention, the aforesaid means comprise at least one electrode connected to the terminals of a voltage source.

BRIEF DESCRIPTION OF THE DRAWINGS

In order that the invention may be more clearly understood, reference will now be made to the accompanying drawings which show one embodiment of burner by way of non-restrictive example and in which.

DETAILED DESCRIPTION OF THE PREFERRED EMBODIMENT

Figure 1:
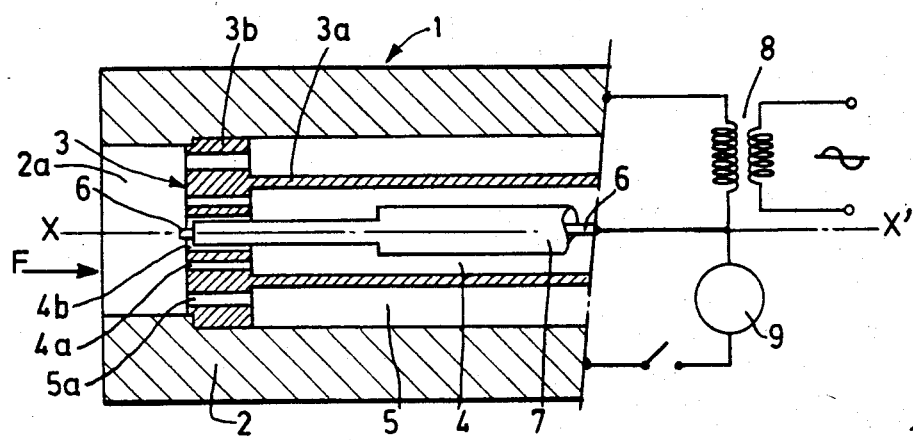
FIG. 1 is a partial view in diagrammatical form and in axial cross-section of the oxy-fuel burner according to the invention.
Figure 2:
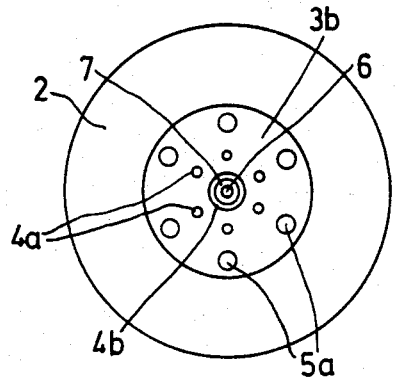
FIG. 2 is an end view of the said burner corresponding to the arrow F of FIG. 1.

Referring now to the drawings, in the embodiment illustrated, the burner in accordance with the invention, generally denoted by the reference 1, comprises a hollow outer body of revolution 2 having the axis X,X' and an axially symmetrical internal structure 3 housed in the said body 2 co-axially with the latter. The structure 3 has a cylindrical part 3a and a disc-shaped element 3b. The structure 3 is positioned within the body 2 in such manner as to leave open in front of the element 3b a front chamber 2a open to the outside. The cylindrical part 3a of the inner structure 3 comprises a central passage 4 supplied with fuel and, with the body 2, delimits an annular passage 5 supplied with oxygen. Orifices 4a and 5a passing through the element 3b establish communication between these passages 4 and 5, respectively, and the chamber 2a.

An electrode 6, for example of copper, and provided with insulation 7 is housed within the cylindrical part 3a of the internal structure 3 co-axially with X,X'. This electrode passes through the element 3b, provided with a passage 4b for this purpose, in such manner that its bare tip projects a little beyond the front plane of the element 3b. The passage 4b may advantageously have a slightly larger diameter than that of the electrode 6 (sheathed by its insulator 7). A voltage generator 8, for example a transformer, is provided to establish a potential difference between the electrode 6 and the burner itself, that is to say between the electrode 6 on the one hand, and the hollow body 2 and the internal element 3 on the other hand. Finally, an ionisation current detector capable of detecting currents of between 5 and 20 milliamps for example, is connected between the electrode 6 and the body of the burner.

Figure 3:
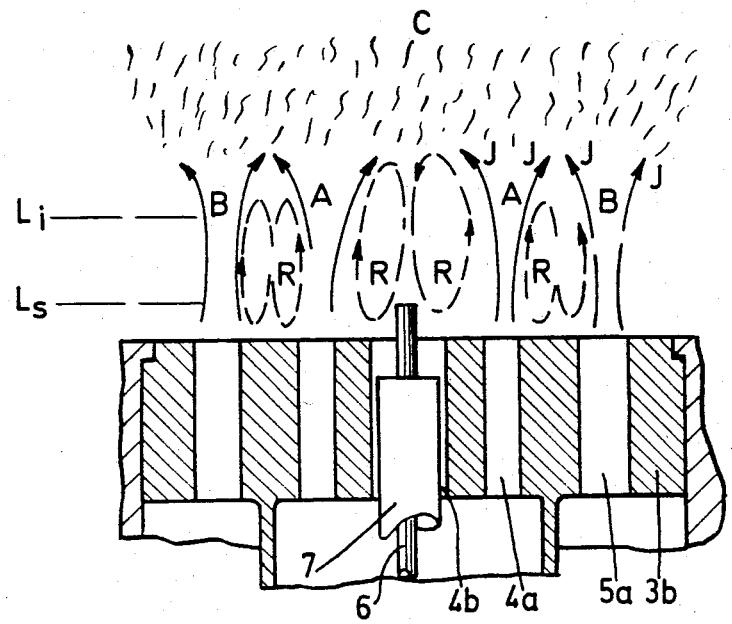
FIG. 3 is an enlarged scale partial view of the burner of FIG. 1, showing the recirculation flows.

FIG. 3 illustrates the jets J emerging from the orifices 4a (hydrocarbon) and 5a (oxygen). At the tip of the burner, these jets establish spaces A rich in hydrocarbon and spaces B rich in oxygen, and are then mixed in an external volume C in which the combustion occurs. The jets J bring about turbulences which return a fraction of the partially burnt gases towards the tip of the burner, forming recirculation flows R which form a mixture having a low proportion of oxygen and fuel and the relative proportions of these two components varies locally, that is to say along these flows. It is known that an inflammability range exists, which is delimited by upper and lower limits $L_s$ and $L_i$, beyond which it is impossible to light the mixture, that is, ignite the burner. The electrode 6 is arranged in such manner that its end is situated within the recirculation flows R but within the inflammability range of the oxygen-fuel mixture, close to the upper limit $L_s$ of this range. This is facilitated by the fact that with pure oxygen as the comburant, the said range has a practically stable lower limit but an upper limit rising to a considerable level.

It is appropriate moreover to observe that the composition of the recirculation gases differs considerably from the stoichiometrical composition, and consequently that the temperature of the volume containing the electrode differs considerably from the adiabatic temperature of oxy-fuel combustion.

Furthermore, the fact that no more than the extremity of the electrode is exposed to a heating action, which heating action is limited moreover by the conduction through the electrode itself, has the result that the thermal and oxidation stresses imposed on the said electrode are reduced considerably.

The injection of a small quantity of fuel around the electrode renders it possible moreover to shift the gaseous environment of the end of the electrode towards low proportions of oxygen.

To light the burner, it is sufficient to close the supply circuit of the transformer 8 causing the generation of a spark between the electrode and the body of the burner.

The ionisation detector 9 thereafter allows of checking on the presence of the flame.

The burner according to the invention may be supplied with different kinds of gaseous fuels, such as methane, propane, butane or else hydrogen.

By way of example, a burner constructed in accordance with the invention has the following characteristics:

rated power: 0.1 mw 6 peripheral holes 5a for oxygen, with a total rate of oxygen flow of 18 $Nm^3/hr$ and an outflow speed of approxmately 100 m/second.

6 holes 4a for natural gas, with a total rate of natural gas flow of 9 $Nm^3/hr$ and an outflow speed of approximately 50 m/sec.

a copper electrode projecting by 3 mms from the front surface of the burner and having a diameter of 3 mms.

The rate of flow of natural gas around the electrode amounts to approximately 1 $Nm^3$/hour.

The composition of the gaseous mixture before ignition, close to the tip of the electrode, is approximately 50% of natural gas and 50% of oxygen by volume. The adiabatic combustion temperature of this mixture is 2450° C.

As soon as the spark is struck, the aforesaid mixture present close to the tip of the electrode ignites whilst yielding combustion products formed by approximately 30% of CO, 3% of $CO_2$, 37% of $H_2$ and 30% of $H_2O$. The combustion then sets in throughout the front of the burner and the recirculation of the combustion products strips a considerable amount of oxygen from the composition of the gaseous mixture close to the tip of the electrode, and the adiabatic combustion temperature of this mixture changes from 2450° C. to a temperature of the combustion products lower than 1800° C. whilst generating —close to the electrode—a highly reducing atmosphere principally comprising CO and $H_2$, the proportions of these two components being practically impossible to determine, the composition of the atmosphere in question being a function of the environment in which the burner operates.

In these circumstances, in constant operation, the temperature of the electrode tip does not exceed 350° C.

A variety of modifications may be made in the form of the embodiment described and illustrated, without thereby departing from the scope of the invention as defined by the appended claims. The electrode could thus be installed in other than co-axial manner in the burner body or the latter may not be of the axial symmetry type.

We claim:

1. In a method for igniting an oxy-fuel burner comprising injecting oxidizing gas and fuel jets from the burner, the jets being arranged to engender recirculation flows during mixing of said oxidizing gas and fuel jets with each other, and inducing an electric ignition spark within a volume of said recirculation flows; the improvement wherein said jets are arranged with an inner ring of fuel jets around said electric ignition spark and an outer ring of oxidizing gas jets around said ring of fuel jets, the flow rates of said jets and the arrangement of said jets relative to said electric ignition spark are such that within said recirculation flow volume the relative proportions of oxidizing gas and fuel lie between the oxidizing-gas-rich and fuel-rich inflammability limits thereof, but closer to the fuel-rich limit.

2. A method according to claim 1, further comprising injecting a complementary jet of fuel into said recirculation volume about said electric ignition spark.

3. A method according to claim 1, wherein said fuel is natural gas, and said recirculation volume contains substantially 60% natural gas and 40% oxygen.

4. In an oxy-fuel burner of the type in which means for supplying oxidizing gas and means for supplying fuel provide jets of oxidizing gas and jets of fuel which mix for combustion and engender recirculation flows having locally varying concentrations of oxidizing gas and fuel, and in which there are means for establishing an electric ignition spark, the spark establishing means being situated within a volume of said recirculation flows; the improvement wherein said oxidizing gas supplying means includes an outer ring of openings about said spark establishing means and connected to a source of oxidizing gas, said fuel supplying means includes an inner ring of openings disposed between said outer ring of openings and said spark establishing means and connected to a source of fuel, said fuel supplying means, said oxidizing gas supplying means, and said spark establishing means are arranged relative to one another so that said recirculation flow volume contains relative proportions of fuel and oxidizing gas between the fuel-rich and oxidizing-gas-rich limits of inflammability thereof, but closer to the fuel-rich limit.

5. A burner according to claim 4, wherein said fuel supplying means also includes means injecting a complementary jet of fuel into the vicinity of said spark establishing means.

6. A burner according to claim 5, wherein said spark establishing means includes a spark electrode disposed in a central portion of said burner, and said complementary fuel jet injecting means includes an annular orifice surrounding said electrode.

* * * * *